Aug. 12, 1969   E. C. RHYNE, JR   3,461,374
CONVERTER CIRCUIT FOR REGULATING VOLTAGE BY
REGULATION OF FREQUENCY
Filed Nov. 26, 1965   6 Sheets-Sheet 1

E. C. RHYNE, JR  
CONVERTER CIRCUIT FOR REGULATING VOLTAGE BY
REGULATION OF FREQUENCY

3,461,374

Filed Nov. 26, 1965

United States Patent Office 3,461,374
Patented Aug. 12, 1969

3,461,374
CONVERTER CIRCUIT FOR REGULATING VOLTAGE BY REGULATION OF FREQUENCY
Earl C. Rhyne, Jr., Millis, Mass., assignor to Dielectric Products Engineering Co., Inc., a corporation of Michigan
Filed Nov. 26, 1965, Ser. No. 509,808
Int. Cl. H02m 1/08, 7/00
U.S. Cl. 321—18
8 Claims

ABSTRACT OF THE DISCLOSURE

An output voltage circuit coupled to an input voltage circuit provides an output voltage from an input voltage. The output voltage circuit includes a ferroresonant transformer voltage control which provides an output voltage having a magnitude dependent upon the frequency of the input voltage and comprises a ferroresonant transformer. A feedback circuit is coupled between the output and the input of the voltage control and varies the frequency of the input voltage of the voltage control in accordance with variations of the output voltage thereof thereby to vary the magnitude of the output voltage to compensate for variations thereof. The feedback circuit comprises an oscillator for producing a voltage having a frequency of oscillation which varies directly as the magnitude of a voltage applied to the oscillator. The oscillator is energized at a substantially constant voltage by a voltage regulator. The voltage regulator is coupled to the oscillator by diodes which control the magnitude of the voltage applied to the oscillator and thereby the frequency of the oscillator.

---

The present invention relates to DC to DC or AC to DC converters. More particularly, the invention relates to voltage regulated converters which provide overload and short circuit protection.

An object of the present invention is to provide a new and improved voltage regulated DC to DC converter.

Another object of the present invention is to provide an AC to DC power supply having overload and short circuit protection which is at the same time regulated.

In accordance with the present invention, a DC voltage source, such as a battery, is supplied, or the voltage from an AC power source is rectified and filtered as required and fed to a DC to AC inverter which produces an AC voltage having a frequency which may be higher than or lower than the input frequency. The AC voltage from the inverter energizes a ferroresonant transformer, the output of which is rectified and filtered and applied to a load. The output voltage of the ferroresonant transformer is substantially constant with input voltage but increases approximately 1.7% per 1% increase in frequency.

In accordance with the present invention, a voltage variation in the rectifier and filtered output voltage of the ferroresonant transformer, which indicates a voltage variation in the input DC or AC power source, or a change in load, is converted to a frequency variation which is then fed back to the ferroresonant transformer via the inverter in a manner to compensate for the voltage variation, thereby regulating the output voltage.

In accordance with the present invention, a power supply system comprises an input such as a battery or other DC source, to provide an input DC voltage having a magnitude which varies. An inverter connected to the input inverts the voltage provided by the input to a substantially square wave AC output voltage having a frequency determined by a frequency controllable oscillator. A ferroresonant transformer connected to the inverter transforms the substantially square wave output voltage of the inverter to an alternating output voltage having a magnitude depending upon the frequency of the substantially square wave voltage. A full-wave rectifier connected to the ferroresonant transformer output rectifies the alternating output voltage of the ferroresonant transformer to a rectified DC output voltage. An oscillator is provided for generating a substantially square wave output voltage having a frequency of oscillation which varies directly as the magnitude of an input voltage applied to the oscillator. A feedback circuit connected between the rectified, filtered inverter output and the oscillator raises and lowers the voltage of the oscillator, hence raising and lowering its frequency. A coupling circuit connecting the oscillator to the inverter applies the substantially square wave output voltage of the oscillator to the inverter to vary the frequency of the substantially square wave output voltage of the inverter and thereby vary the magnitude of the alternating output voltage of the ferroresonant transformer in such a manner as to hold the rectified, filtered DC output at the inverter constant. Although the ferroresonant transformer provides a substantially constant output voltage for changes in input voltage, the output voltage tends to decrease with an increase in the load current due to regulation in the rectifier diodes, filter chokes, wiring, and such of the converter. The feedback circuit senses a change in output voltage, for whatever reason, and modifies the inverter frequency in such a manner as to hold the voltage constant.

In order that the present invention may be readily carried into effect, it will now be described with reference to the accompanying drawings, wherein.

In the figure, the same components are identified by the same reference numerals.

Figure 1:
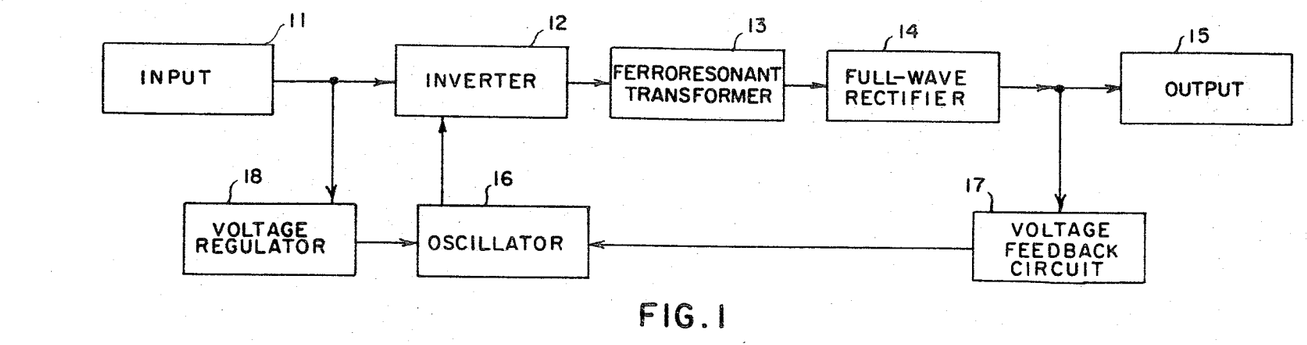
FIG. 1 is a block diagram of the principal components of an embodiment of the voltage regulated converter of the present invention.

In FIG. 1, an input 11 includes a source of DC voltage which is applied to an inverter 12. The inverter 12 converts the voltage into a square wave voltage which is applied to a ferroresonant transformer 13 which provides an output voltage which is rectified by a full-wave rectifier 14 and which is preferably filtered. The output voltage may be derived from an output 15.

Output voltage variations caused by variations in load currents, input voltage, inverter frequency, and other causes, appear at the output of the ferroresonant transformer 13. The rectified output voltage of the ferroresonant transformer 13 is applied to an oscillator 16 via a voltage feedback circuit 17. The oscillator 16 is energized by a voltage regulator 18, which is energized by the input 11, and functions to hold the output DC voltage substantially constant by varying the frequency of the inverter 12. When the output DC is higher than the equilibrium value, the feedback circuit functions to lower the inverter frequency, thereby lowering the output DC voltage. When the output DC is lower than the equilibrium voltage, the feedback circuit functions to raise the inverter frequency, thereby raising the output voltage. The inverter frequency is determined by the oscillator 16, as modified by the feedback circuit 17.

Figure 2:
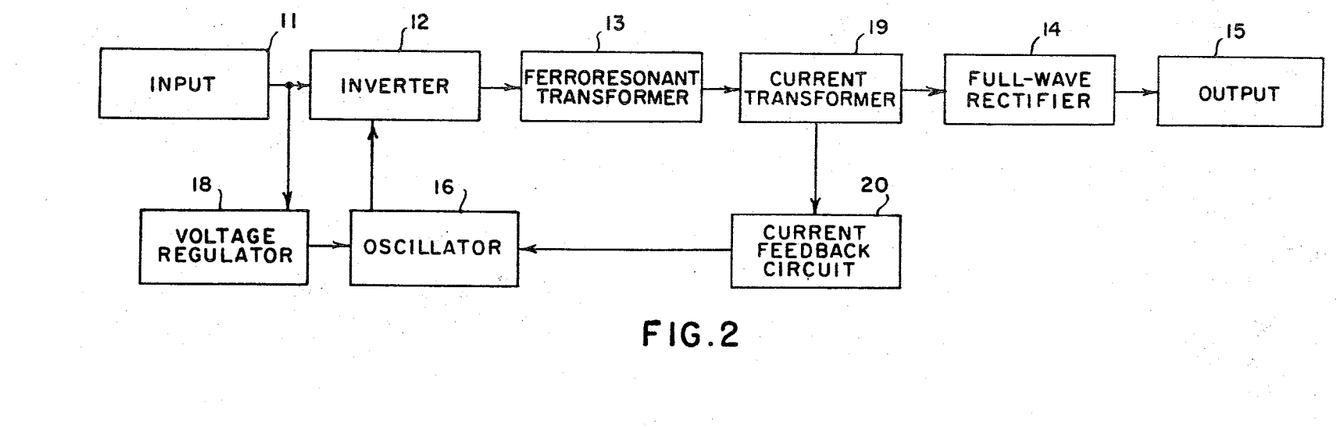
FIG. 2 is a block diagram of the principal components of a modification of the embodiment of FIG. 1 which is voltage stabilized by load current compounding.

The block diagram of FIG. 2 is identical to that of FIG. 1, except that a load current feedback circuit is utilized instead of the voltage feedback circuit 17. The load current feedback circuit comprises a current transformer 19 in series with the full-wave rectifier 14 which is connected to the AC load current output from the ferroresonant transformer 13 and a current feedback circuit 20. The output of the current transformer 19 is proportional to the load current of the inverter 12 and is connected to the current feedback circuit 20. The current feedback circuit 20 functions to modify the inverter frequency in a manner such as to prevent the output voltage at the output 15 from decreasing as load current increases. As load increases, the load current feedback circuit functions to raise the inverter frequency a proportional amount, thereby raising the output voltage from an otherwise lower value, and thereby holding the output voltage substantially constant with changes in load.

Figure 3:
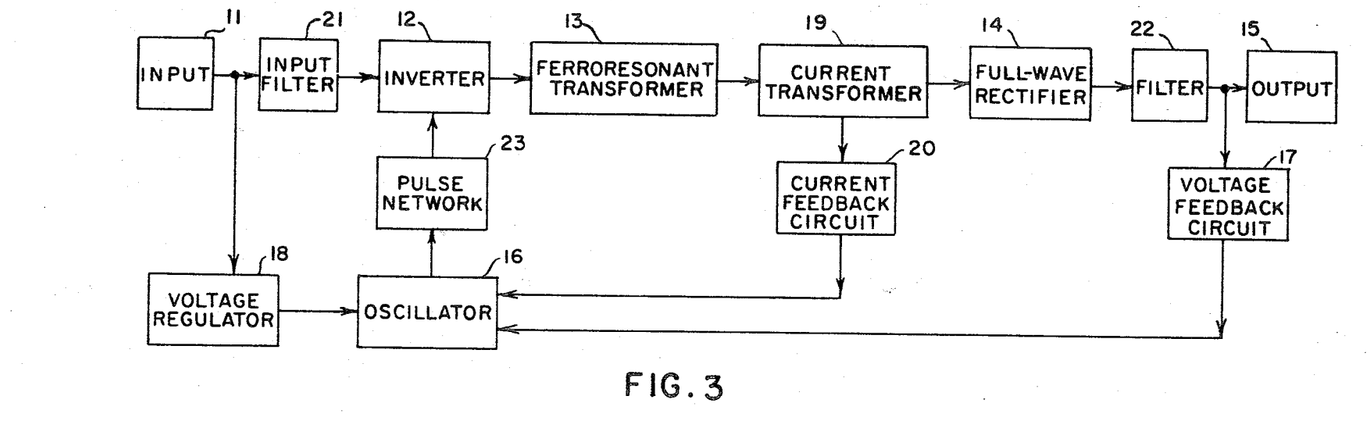
FIG. 3 is a block diagram of a modification of the embodiment of FIG. 1 incorporating both voltage regulation and load current compounding.

In FIG. 3, the DC voltage from the input 11 is filtered by a filter 21 before it is applied to the inverter 12. The output voltage of the ferroresonant transformer 13 is rectified by the full-wave rectifier 14 and filtered by a filter 22 before it is provided at the output 15. Both the voltage feedback circuit 17 and the load current feedback circuit comprising the current transformer 19 and the current feedback circuit 20, are utilized. Typically, only one feedback circuit is used, but both may be used. The filter 21 filters noise generated by the inverter operation from the DC input 11 when required. When such DC voltage is derived from a rectified AC supply, the filter 21 attenuates the ripple of such rectified supply furnished to the inverter. The output of the oscillator 16 is applied to the inverter 12 via a pulse network 23.

Figure 4A:
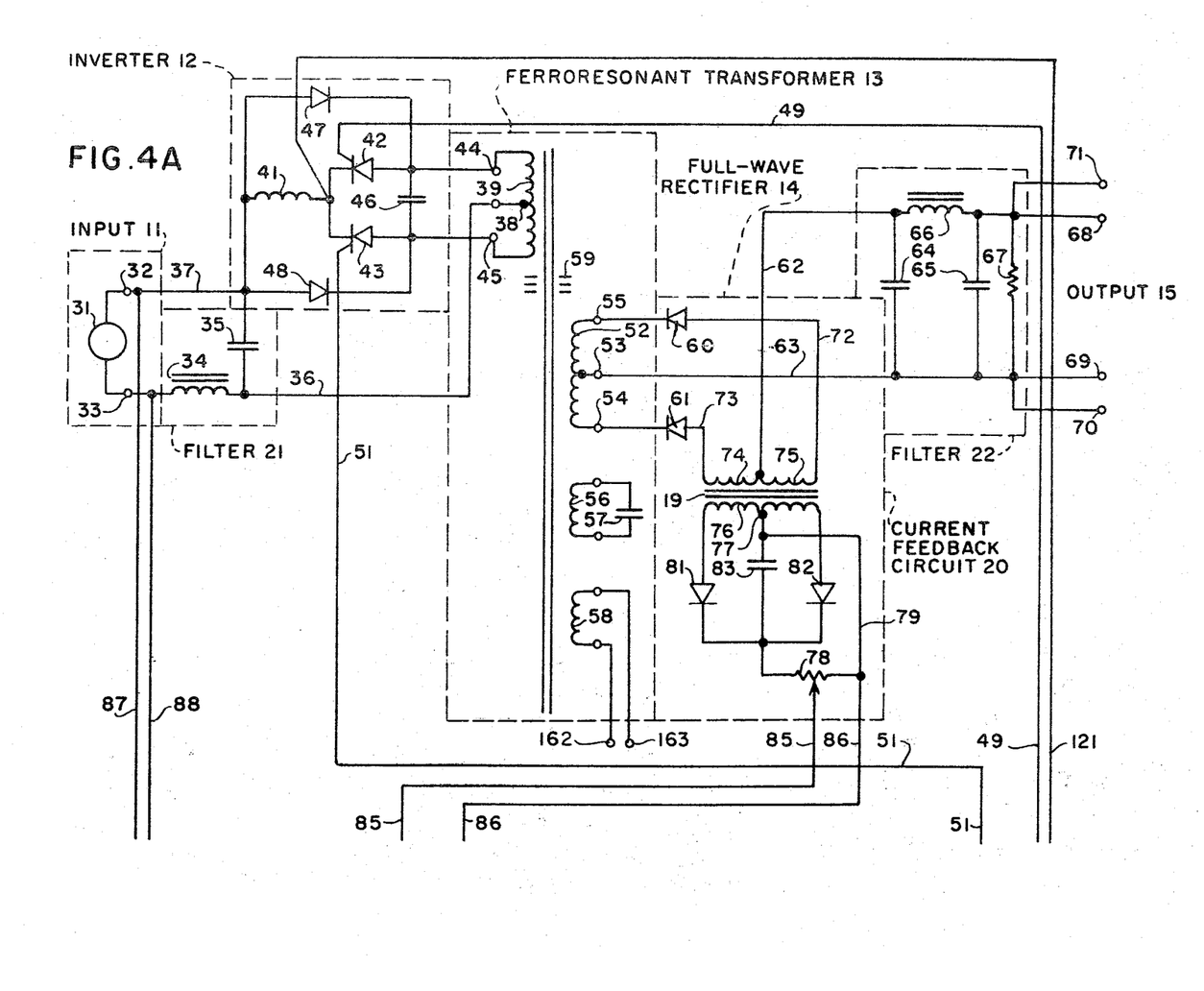
FIGS. 4A and 4B together are a circuit diagram of the embodiment of FIG. 3, with the voltage feedback circuit not shown.
Figure 4B:
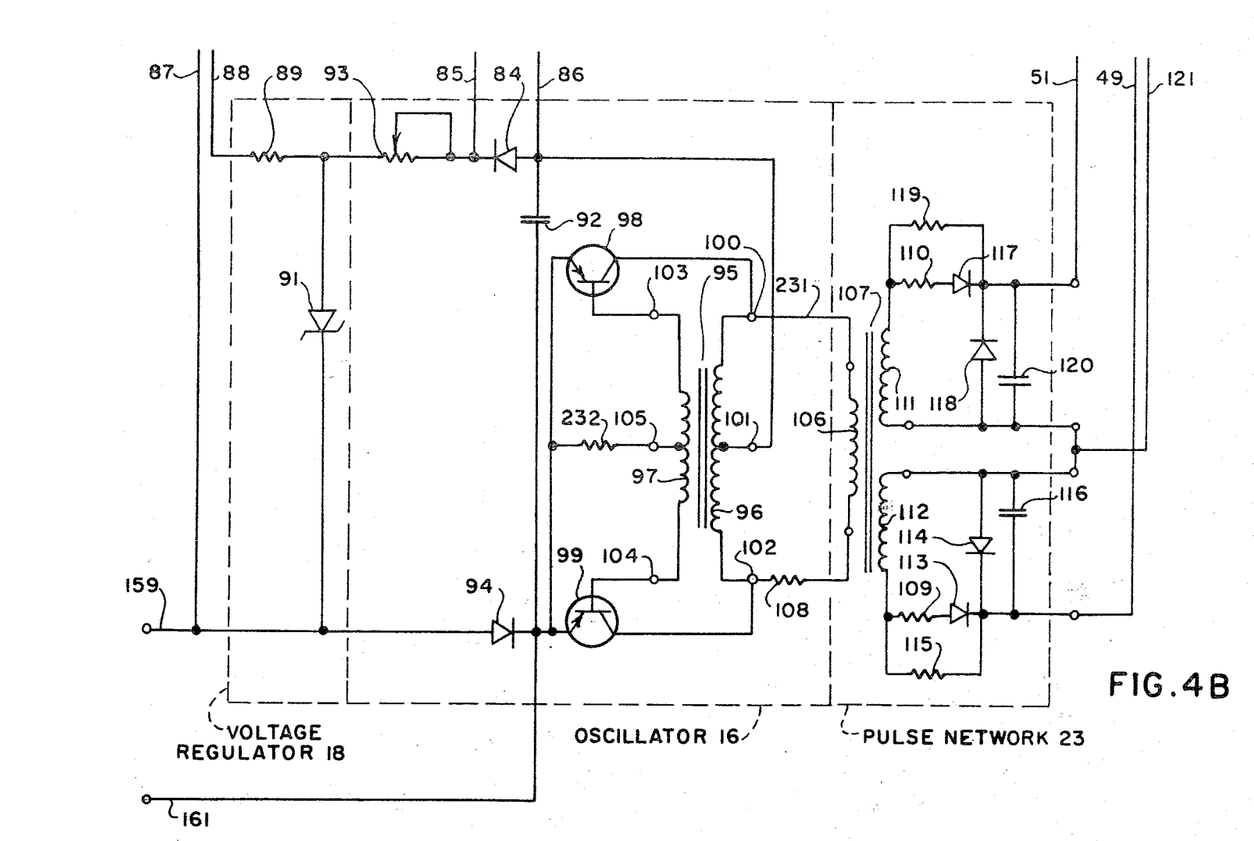

In FIGS. 4A and 4B, DC voltage from a power source 31 is applied to input terminals 32 and 33 of the input 11. AC noise generated by the operation of the inverter 12 is filtered from the DC voltage source or input 11 by the filter 21, which comprises any suitable ripple filter such as, for example, a series connected choke 34 and a parallel connected capacitor 35. The input of the filter 21 is connected to the inverter 12 via leads 36 and 37.

The leads 36 and 37 are the input leads of the inverter 12. The inverter 12 preferably comprises a McMurray-Bedford parallel inverter circuit of the type described and illustrated in Westinghouse Silicon Controlled Rectifier Designer's Handbook, Robert Murray, Jr., Editor, First Edition, 1963, Westinghouse Electric Corporation, Semiconductor Division, Youngwood, Pa., pages 17–14 to 17–17 and in Silicon Controlled Rectifier Manual, Second Edition, 1961, General Electric Company, Rectifier Components Department, Auburn, N.Y., pages 152 to 154.

The McMurray-Bedford parallel inverter utilizes silicon controlled rectifiers or SCR's. The inverter 12 may utilize transistors, if such transistors have suitable voltage ratings. The lead 36 supplies the input to the inverter 12 via a center tap 38 on the primary winding 39 of the ferroresonant transformer 13. The input is also supplied via the lead 37 to one end of an inductor 41 of the inverter 12.

The McMurray-Bedford inverter 12 comprises a first SCR 42 having an anode, a cathode and a control or gate electrode, and a second SCR 43 having an anode, a cathode and a control or gate electrode. The anode of the first SCR 42 is connected to an end terminal 44 of the primary winding 39 of the ferroresonant transformer 13 and the anode of the second SCR 43 is connected to the other end terminal 45 of said primary winding. The cathodes of the first and second SCR's 42 and 43 are connected to the other end of the inductor 41.

A commutating capacitor 46 is connected across the primary winding 39 of the ferroresonant transformer 13 between the end terminals 44 and 45 thereof. A first diode 47 is connected between the anode of the first SCR 42 and the lead 37 and a second diode 48 is connected between the anode of the second SCR 43 and the lead 37. The first and second diodes 47 and 48 are utilized to bypass reactive current in the primary winding 39 of the ferroresonant transformer 13. The control electrodes of the first and second SCR's 42 and 43 are connected to the oscillator 16 via the pulse network 23 and control the conductive and non-conductive condition of said SCR's via leads 49 and 51 in a manner which is hereinafter described.

The McMurray-Bedford inverter 12 comprises a first wave output in the following manner. When the first SCR 42 is conductive and the second SCR 43 is non-conductive, the right-hand terminal of the inductor 41 and the end terminal 44 of the primary winding 39 of the ferroresonant transformer 13 have a voltage which is negative relative to the lead 36 and approaching the voltage at the lead 37. The autotransformer operation of the ferroresonant transformer 13 applies a relatively positive voltage to the end terminal 45 of the primary winding 39; the positive voltage having a magnitude which is twice the magnitude of the voltage between the terminals 38 and 44 of said primary winding. The voltage across the capacitor 46 also has a magnitude which is almost twice the magnitude of the voltage across the capacitor 35.

When the gate electrode of the second SCR 43 is biased with a current sufficient to make said second SCR conductive, a current surge flows from the capacitor 46 terminal connected to the terminal 45 of the winding 39 of the ferroresonant transformer 13 through said second SCR and the inductor 41 thereby discharging the capacitor 46. During this current surge, the voltage of the capacitor 46, being greater than the voltage supplied from the input 11, is applied across anode-to-cathode of the first SCR 42, thereby reverse-biasing said first SCR to make it non-conductive. The reverse-bias is of sufficient duration to maintain the first SCR 42 in its non-conductive or blocked condition, while the second SCR 43 remains conductive. The circuit reverts to its initial condition, when the gate electrode of the first SCR 42 is biased with a current sufficient to make said first SCR conductive. The inductor or commutating choke 41 limits the current drawn from the input 11 during the short interval when both SCR's 42 and 43 are conductive.

The inductive load presented by the ferroresonant transformer 13 may not permit an instantaneous current reversal in the load. When the terminal 45 of the primary winding 39 of the ferroresonant transformer 13 is positive, the inductive effect of the secondary winding of said ferroresonant transformer is to impose on said terminal 45 a negative voltage. When the terminal 45 is made negative by the reversal in operation of the first and second SCR's 42 and 43, a continuing current through the transformer load reinforces the negative polarity and extends it. The magnitude of the voltage at the terminal 45 therefore drops below that of the voltage at the lead 37 and current flows through the diode 48 between the lead 37 and the terminal 45.

The ferroresonant transformer 13 may comprise any suitable ferroresonant transformer device such as, for example, that shown and described in General Electric Voltage Stabilizing Transformers, GEA–5754C, General Electric Company, Schenectady, N.Y., 1957, page 9.

The ferroresonant transformer 13 provides a substantially constant output voltage at its secondary winding 52 although the voltage applied to its primary winding is of varying amplitude. The output voltage of the ferroresonant transformer 13 is a direct function of the frequency of the input voltage and a change of about 1% in the frequency of the input voltage will produce a change of about 1.7% in the magnitude of the output voltage. The leakage characteristic of the ferroresonant transformer 13 permits the output of said transformer to be continuously short circuited without damage or destruction to the said transformer.

Because of the flow of inductive current through the diode 48 during part of the half cycle in which the second SCR 43 is supposed to be in its conductive condition, the magnitude of the holding current through said second SCR can be zero or so low that the said second SCR is extinguished or made non-conductive. Only a continuing firing voltage applied to its gate electrode after the inductive current flow ceases will reestablish conduction of the second SCR 43. It is thus essential that the gate electrodes of the first and second SCR's 42 and 43 be biased by a voltage which maintains an output for at least ninety degrees after the original on or switching pulse in order to cope with a highly inductive load. This is achieved by the oscillator 16, as hereinafter described.

The ferroresonant transformer 13 has a secondary winding 52 which is loosely coupled with the primary winding 39. The output of the ferroresonant transformer 13 is derived from a center tap 53 and an end terminal 54 of the secondary winding 52. The secondary winding 52 has another end terminal 55. The ferroresonant transformer 13 has another secondary winding 56 which is loosely coupled with the primary winding 39 and is tightly coupled with the secondary winding 52. A capacitor 57 is connected across the winding 56 and is energized thereby. The ferroresonant transformer 13 comprises still another secondary winding 58 which provides an isolated auxiliary voltage source for the regulating circuit of FIG. 7.

The ferroresonant transformer 13 is constructed with a magnetic shunt 59 between the core of the primary winding 39 and the core of the secondary windings 52, 56 and 58. A portion of the magnetic path of the secondary windings is constricted so that it operates in magnetic saturation. The magnetic shunt 59 is equivalent to an inductive reactance in series between the primary winding 39 and the secondary windings. This forces the secondary core into ferroresonance with the capacitor 57 in such a manner that the secondary winding voltages tend to remain constant with varying voltages from the input 11. The magnitude of these constant voltages is determined by the saturated core flux density and is accordingly directly proportional to the inverter frequency. The secondary winding 52 of the ferroresonant transformer 13 supplies voltage for the converter output load circuit, the winding 56 supplies the voltage for the ferroresonant capacitor 57, and the winding 58 provides an isolated auxiliary voltage source for the regulating circuit of FIG. 7.

Figure 5:
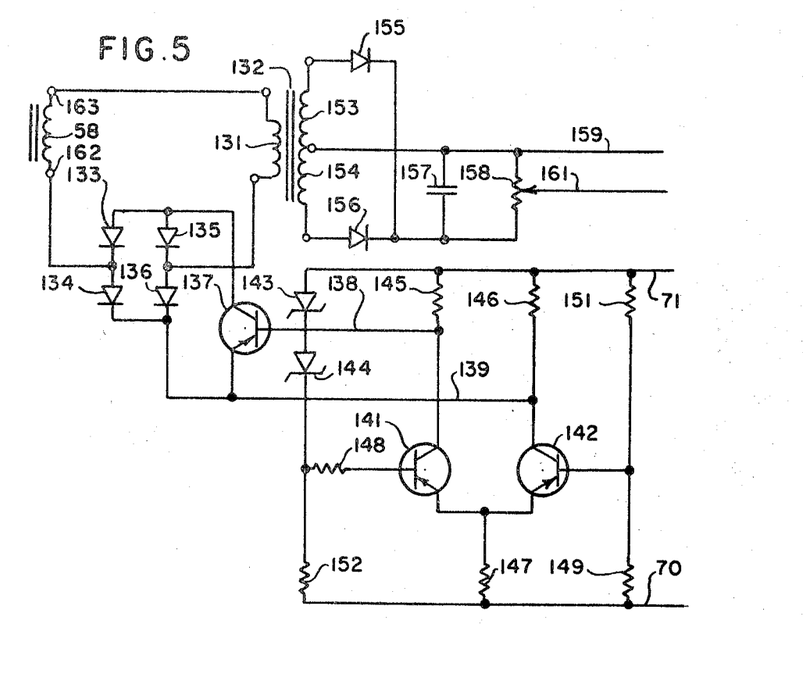
FIG. 5 is a circuit diagram of the voltage feedback circuit of the embodiments of FIGS. 1 and 3.
Figures 7, 9:
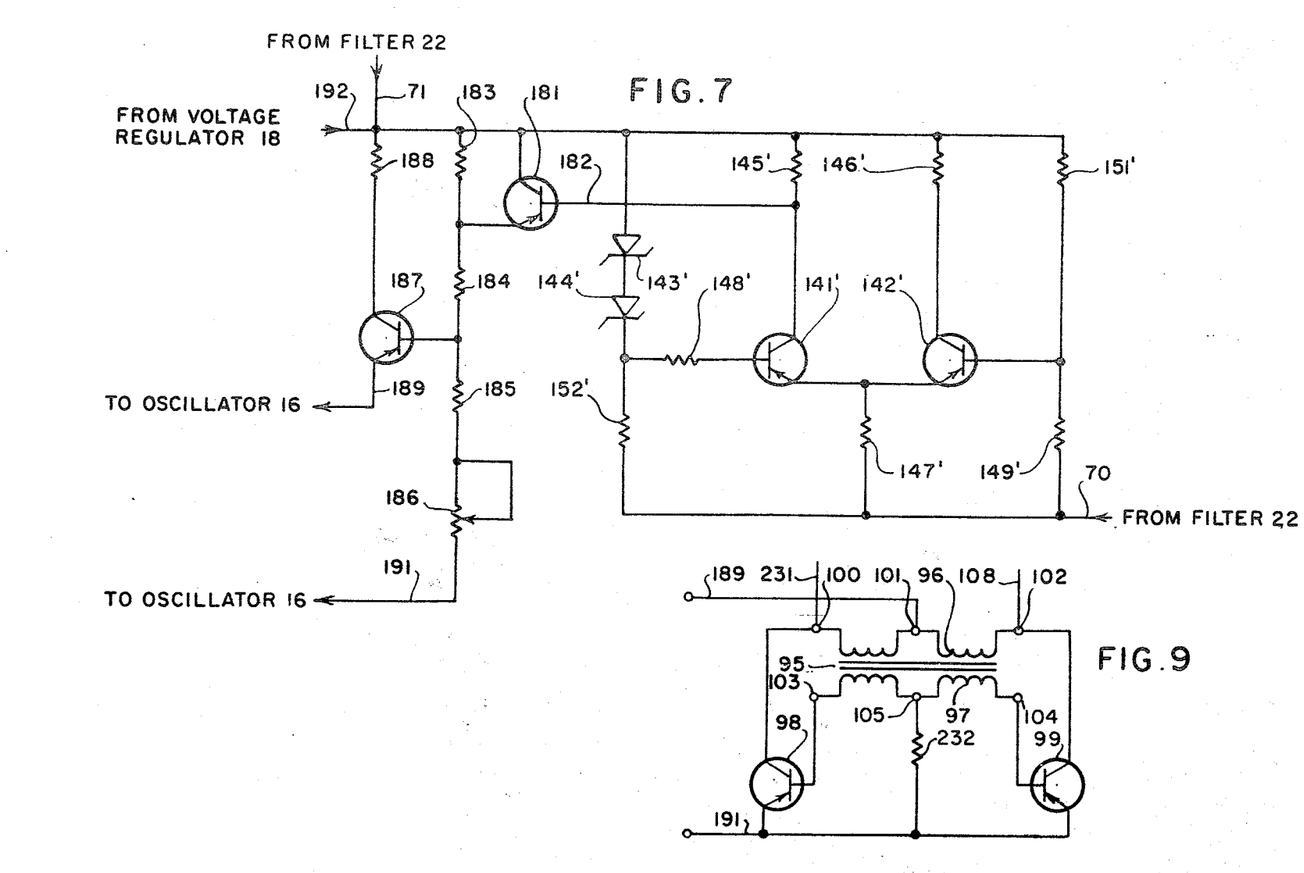
FIG. 7 is a circuit diagram of the voltage feedback circuit of the embodiment of FIG. 6.
FIG. 9 is a circuit diagram of the oscillator of the embodiment of FIG. 6.

The constant output voltage of the ferroresonant transformer 13 across the terminals 54 and 55 of the secondary winding 52 thereof is applied to the full-wave rectifier 14. The full-wave rectifier 14 comprises rectifier diodes 60 and 61. The DC output of the full-wave rectifier 14 is applied via leads 62 and 63 to the filter 22. The filter 22 may comprise a single Pi circuit including an input capacitor 64, an output capacitor 65 and a choke 66. The output of the filter 22 appears across a resistor 67 and may be derived from output terminals 68 and 69 of the output 15. Additional control connections to the output 15 for the voltage feedback circuits of FIGS. 5 and 7 are provided by leads 70 and 71. The filter 22 may comprise any suitable filter circuit.

In order to provide load-current compounding of the voltage provided at the output terminals 68 and 69, the voltage across leads 72 and 73 in the output of the full-wave rectifier 14 is derived from said rectifier by means of the current transformer 19 of the current feedback circuit 20. The current transformer 19 comprises a primary winding 74 connected between the leads 72 and 73 and having a tap 75 to which the lead 62 is connected. The current transformer 19 also comprises a secondary winding 76 having a center tap 77 to which one end terminal of a potentiometer 78 is connected via a lead 79.

The other end terminal of the potentiometer 78 of the current feedback circuit 20 is connected to the secondary winding 76 of the current transformer 19 via a full-wave rectifier comprising rectifier diodes 81 and 82 and a filter capacitor 83. The voltage across the potentiometer 78 of the current feedback circuit 20 is DC and is directly proportional to the load current. A portion of the feedback voltage may thus be fed back to the voltage source of the oscillator 16 via a diode 84. The output voltage across leads 85 and 86 is thus utilized to energize or to control the energization of the oscillator 16.

The oscillator 16 preferably comprises an oscillator of the type known as a Royer oscillator which is shown and described in DC-DC Germanium Power Converters, Texas Instruments Incorporated, Dallas, Tex., Application Notes, August 1961. The Royer oscillator 16 generates a square wave output having a frequency which varies as the magnitude of the voltage applied to its input; the frequency of oscillation being directly proportional to the voltage applied thereto.

The oscillator 16 is energized by the voltage regulator 18 which may comprise any suitable voltage source and which may derive its own power from the input terminals 32 and 33 of the input 11 via leads 87 and 88. The voltage regulator 18 comprises a resistor 89 connected in series with a Zener diode 91 between the leads 87 and 88. The constant output voltage of the voltage regulator 18 is applied to an input capacitor 92 of the oscillator 16 via a variable resistor 93 and the rectifier 84 in the lead 88, and via a rectifier 94 in the lead 87. The constant voltage applied to the oscillator 16 by the voltage regulator 18 results in a constant frequency output from said oscillator. The voltage from the voltage regulator 18 is maintained constant to maintain a constant frequency output from the oscillator 16 as the DC input voltage varies, since the output of the ferroresonant transformer 13 is substantially constant with input voltage variations.

The oscillator 16 comprises a transformer 95 having a saturable core, a primary winding 96 and a secondary winding 97. The primary winding 96 of the transformer 95 forms paths of major current flow between the leads 87 and 88 with the emitter-collector paths of a pair of transistors 98 and 99. These paths of major current flow are parallel to each other. The voltages induced in the primary winding 96 between terminals 100 and 101 and between terminals 101 and 102 are fed back to the bases of the transistors 98 and 99, respectively, upon the switching of the transistors 98 and 99, respectively, to their conductive condition by means of the secondary winding 97.

The secondary winding 97 of the transformer 95 includes terminals 103 and 104 and a center tap 105 and the winding portions 103 and 105 and 105 and 104 function as positive feedback windings. The primary windings are biased at the center terminal or tap 101 at a predetermined voltage determined by the Zener diode 91 connected across the leads 87 and 88. The output of the oscillator 16 is derived via the primary winding 106 of a transformer 107 of the pulse network 23.

If the transistor 98 is in conductive condition and the transistor 99 is in non-conductive condition, the positive feedback secondary winding portions build up and reinforce the prevailing condition. Feedback from the collectors of the transistors 98 and 99 to their respective emitters is effected through the windings of the transformer 95 by a uniform increase of core flux and consequent steady voltage sustained across the windings. The voltages across the windings are collapsed by the saturation of the core of the transformer 95. This reverses the direction of potential difference at the respective bases and collectors of the transistors 98 and 99. The feedback maintains the change of direction and switches the transistor 98 from its conductive condition to its non-conductive condition and switches the transistor 99 from its nonconductive condition to its conductive condition. This condition prevails until the core of the transformer 95 saturates again and a square wave output is produced by the oscillator 16. If a higher voltage is impressed across the primary winding 96 of the transformer 95, the uniform increased in core flux will proceed at a greater rate, causing the core to saturate in less time, and thus will cause an increase in oscillator frequency. Oscillator frequency is thus substantially directly proportional to the voltage impressed across the primary winding 96.

When no external voltage is impressed on the oscillator 16, the frequency is determined by the constant voltage of the Zener diode 91, less the voltage drop across the resistor 93 and the forward drops at the diodes 84 and 94. Since the load on the oscillator 16 is substantially constant, even with varying SCR gate impedances, due to load or current limiting resistors 108, 109 and 110, the voltage drop across the resistor 93 is substantially constant. With no external voltage applied, the voltage drops across the diodes 84 and 94 are also substantially constant, even for changes in oscillator load, since they are caused by the diode forward voltage drops, which are essentially constant with current. Thus, the minimum frequency at which the oscillator 16 can operate is determined by the voltage of the Zener diode 91, the forward drops of the diodes 84 and 94, and the setting of the adjustable resistor 93. The diodes 84 and 94 provide convenient means for raising the voltage applied to the primary winding 96 of the transformer 95, thereby raising the frequency of the oscillator 16 above the aforementioned minimum value, in dependence upon externally generated DC feedback voltages.

As shown in FIG. 4A, the current feedback circuit 20 provides a means for raising the frequency of the oscillator 16 above the minimum value in dependence upon the inverter load current. Assuming no external voltage applied across the diode 94, when the inverter load is zero no external voltage is supplied across the diode 84. As the inverter load increases, a load proportional DC voltage is developed between the potentiometer output leads 85 and 86, with positive polarity on the lead 85. When this voltage is greater than the forward drop of the diode 84, the diode 84 becomes reverse-biased and the current of the primary winding 96 of the transformer 95 flows through the potentiometer 78. This increases the voltage applied to the primary winding 96 to the extent that it becomes equal to the sum of the voltage drops across the Zener diode 91 and potentiometer 78, less the voltage drop across the resistor 93, and less the forward drop across the diode 94. An increase in the magnitude of the DC voltage across the rectifier diode 84 increases the voltage applied to the oscillator 16 and increases the frequency of the voltage produced by said oscillator. The square wave output of the oscillator 16 is applied to the inverter 12 to vary the frequency of the input voltage of the ferroresonant transformer 13 and thereby to vary the magnitude of the output voltage of said ferroresonant transformer to compensate for variations in the output voltage due to changes in load current at the output terminals 68 and 69. The output voltage of the oscillator 16 is applied to the inverter 12 via the pulse network 23 which functions to convert the square wave into pulse shapes suitable for application to the control or gate electrodes of the first and second SCR's 42 and 43 of said inverter.

The pulse network 23 may comprise any suitable circuit for shaping a square wave into pulses of a shape suitable for controlling the gate electrode of an SCR. The pulse network 23 also provides a limited pulse to the SCR's 42 and 43 to reduce the gate dissipation therein. The pulse network 23 may comprise, for example, the transformer 107, which is a saturating pulse transformer having the primary winding 106 and secondary windings 111 and 112. The pulses applied to the control electrode of the first SCR 42 of the inverter 12 via the lead 49 are produced by diode rectifiers 113 and 114, a leakage resistor 115, the current limiting resistor 109 and a capacitor 116. The diode rectifier 113 is connected in the lead 49, and the diode rectifier 114 and the capacitor 116 are connected in shunt across the diode rectifier 117. The limit-sistor 115 is connected in shunt across the diode rectifier 113. The limiting resistor 109 is connected in series with the diode 113.

The pulses applied to the control electrode of the second SCR 43 of the inverter 12 via the lead 51 are produced by diode rectifiers 117 and 118, a leakage resistor 119, the limiting resistor 110 and the capacitor 120. The diode rectifier 117 is connected in the lead 51, and the diode rectifier 118 and the capacitor 120 are connected in parallel with the lead 51. The leakage resistor 119 is connected in shunt across the diode rectifier 117. The limiting resistor 110 is connected in series with the diode 117.

The shaped pulses produced by the pulse network 23 switch the first and second SCR's 42 and 43 to their conductive and non-conductive conditions. If the volt seconds capacity of the transformer 107 is greater than the volt seconds supplied to the primary winding 106 of said transformer from the input winding 96 of the transformer 95 of the oscillator 16, 180 degrees of voltage will be supplied alternately by the windings 111 and 112 of the transformer 107. If the volt seconds capacity of the transformer 107 is less than the supplied volt seconds, less than 180 degrees of voltage will be supplied by the windings 111 and 112 of said transformer. The instant of saturation and the resulting commutation in the oscillator 16 is determined by the number of volt seconds applied to the windings interlinked with the core of the saturable transformer 95. Thus, if the voltage between the leads 85 and 86 increases, saturation occurs earlier, thereby increasing the frequency of commutation and of the output of the oscillator. If the voltage between the leads 85 and 86 decreases, the frequency of the output of the oscillator decreases. The square-wave output of the oscillator 16 enables the SCR's of the inverter 12 to adequately handle the inductive and capacitive loads to which it is subjected by the ferroresonant transformer 13. A lead 121 is connected between a common point in the connection between the circuits of the windings 111 and 112 of the transformer 107 and a common point in the connection between the cathodes of the first and second SCR's 42 and 43 of the inverter 12.

Any suitable type of voltage feedback may be utilized in the circuit arrangements of FIGS. 1, 3, 4A and 4B, and 6. The circuit of FIG. 5 is particularly suitable for use with the circuit of FIGS. 4A and 4B. In FIG. 5, the winding 58 of the ferroresonant transformer 13 supplies a substantially constant AC voltage to the primary winding 131 of an auxiliary current transformer 132, in series with a current regulating network comprising a fullwave rectifier bridge including diodes 133, 134, 135 and 136, and a PNP transistor 137 having a base lead 138 and an emitter lead 139. The base-to-emitter control voltage for transistor 137 is supplied by a voltage sensing network comprising PNP transistors 141 and 142, Zener reference diodes 143 and 144, transistor collector resistors 145 and 146 having equal resistance values, an emitter resistor 147, a base resistor 148, voltage divider resistors 149 and 151 and a current limiting resistor 152. The lead 71 of the voltage sensing network connects to the negative terminal of the converter output 15 and the lead 70 connects to the positive terminal of said converter output. The voltage sensing network is in an equilibrium condition only when the voltage drop across the resistor 151 equals the voltage across the series connected Zener diodes 143 and 144. Under this condition, the base potentials of the transistors 141 and 142 are approximately equal and the two transistor collector currents are equal; hence the current flow through the equal resistors 145 and 146 is equal and the voltage drops across these resistors are equal. Since the voltages across the resistors 145 and 146 are equal, the potential between the leads 138 and 139 is zero. Under this condition, the transistor 137 is non-conductive and no current will flow through the primary winding 131 of the current transformer 132. This equilibrium condition occurs at a definite value of the output voltage at the output 15, since the voltage drop across the resistor 151 is directly proportional to the voltage at the output 15.

If the output voltage at the output 15 is lower than the equilibrium value, the voltage drop across the resistor 151 is less than the voltage across the series connected Zener diodes 143 and 144, making the base potential of the transistor 142 more negative than the base potential of the transistor 141. Since the two transistors have a common emitter potential, the transistor 142 becomes more conductive and the transistor 141 becomes more non-conductive, causing the current flow through the resistor 146 to increase while the current flow through the resistor 145 decreases. This causes the base of the transistor 137 to develop a negative potential with respect to its emitter and causes a current to flow through the emitter-collector circuit of said transistor, and in turn causes an AC current flow through the primary winding 131 of the current transformer 132. The secondary windings 153 and 154 of the transformer 132 are connected in a center-tapped rectifier circuit arrangement including rectifier diodes 155 and 156. The rectified output is filtered by a capacitor 157 and is applied across a potentiometer 158 with a lead 159 having a negative potential and a tap lead 161 having a positive potential. The voltage between the leads 159 and 161 is thus proportional to the emitter-collector current flow through the transistor 137, which in turn is proportional to the error voltage developed between the leads 138 and 139. The voltage across the leads 159 and 161 is applied across the diode 94 of FIG. 4B. When this voltage exceeds the forward drop across the diode 94, said diode is reverse biased and begins operating in a blocking mode. The current flow from the lead 87 to the transistors 98 and 99 of the oscillator 16 then no longer flows through the diode 94, but flows through the leads 159 and 161 of the potentiometer 158 in a manner whereby the voltage across said leads 159 and 161 adds to the voltage of the Royer oscillator circuit 16. This increase in the oscillator voltage causes an increase in the oscillator frequency, which in turn increases the voltage of the output 15 of the converter, which then increases the voltage drop across the resistor 151 and tends to restore the voltage sensing circuit to its equilibrium condition. Since the circuit can make no voltage correction when the voltage across the resistor 151 is greater than the voltage across the series connected Zener diodes 143 and 144, the normal circuit operating condition is such that the voltage across the resistor 151 is slightly less than the Zener voltage.

The resistor 152 merely determines the current flow through the series connected Zener diodes 143 and 144. The voltage drop across the resistor 147 must approximately equal the voltage drop across the voltage divider resistor 149 and thus determines the magnitude of current flow through the transistors 141 and 142. The base resistor 148 compensates the voltage sensing circuit for temperature variations. The end terminals 162 and 163 of the winding 58 of the ferroresonant transformer 13 are the same in FIGS. 4A and 5.

Figure 6:
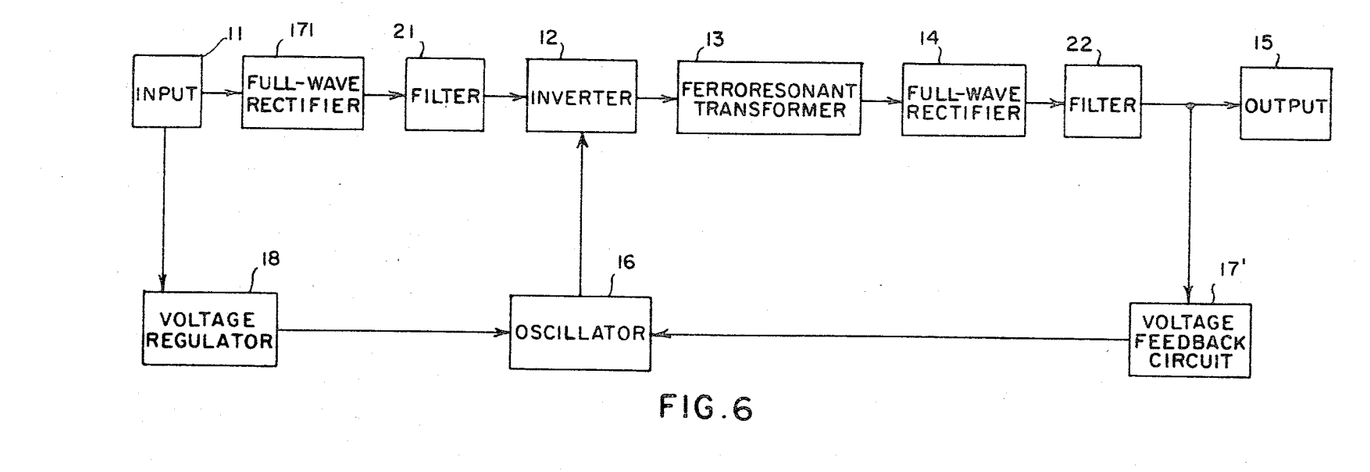
FIG. 6 is a block diagram of a modification of the embodiment of FIG. 3, with the input voltage supplied from an AC source.

In FIG. 6, the AC input 11 is used in conjunction with a full-wave rectifier 171 instead of the DC input used in the embodiments of FIGS. 1, 3 and 4A. The voltage feedback circuit 17' comprises a comparator which derives its inputs from the output of the filter 22 and the voltage regulator 18. The pulse network 23 between the oscillator 16 and the inverter 12 is dispensed with in FIG. 6, although it may be readily utilized. FIG. 6 functions in essentially the same manner as FIG. 3, except for the AC input. The filter 21 of FIG. 6 filters the AC ripple from the inverter 12, whereas the filter 21 of FIG. 3 prevents ripple voltages generated by said inverter from getting into the DC supply 11. Another distinction between the system of FIGS. 3 and 6 is the comparator circuit which comprises the voltage feedback circuit 17' of FIG. 6.

FIG. 7 is a circuit diagram of a comparator which may be utilized as the comparator of the voltage feedback circuit 17' of FIG. 6. The leads 71 and 70 connect the output of the filter 22 of FIG. 6 to the comparator circuit. The comparator circuit includes a pair of transistors 141' and 142' in differential amplifier connection. A common emitter resistor 147' connects the emitters of the transistors 141' and 142' to the positive lead 70 which is connected to the positive side of the output of the filter 22. A pair of collector resistors 145' and 146' connect the collectors of the transistors 141' and 142' to the negative lead 71 which is connected to the negative side of the output of the filter 22.

A voltage divider comprising resistors 149' and 151' is connected between the leads 71 and 70 and biases the base of the transistor 142'. The base of the transistor 141' is connected to the negative lead 71 via a pair of Zener diodes 143' and 144' and a temperature compensating resistor 148'. A resistor 152' is connected between the positive lead 70 and each of the pair of Zener diodes 143' and 144', and the temperature compensating resistor 148', and serves to energize said Zener diodes. The base of a transistor 181 is connected to the collector of the transistor 141' and the collector of said transistors 181 is connected directly to the negative lead 71.

When the voltage across the output of the filter 22 is, for example, too low, the voltage across the resistor 151' is less than the voltage across the Zener diodes 143 and 144 and is proportional to the voltage across the output capacitor of the filter 22. The base of the transistor 142' thus becomes more negative than the emitter thereof so that the said transistor is made conductive and the transistor 141' is made more non-conductive. As the transistor 141' is made more non-conductive, a lead 182 connecting the collector of the transistor 141' to the base of the transistor 181 becomes more negative and causes said transistor 181 to become more conductive.

The transistor 181 is energized by the voltage regulator 18 of FIG. 6. A voltage divider comprising resistor 183, 184 and 185 and a variable resistor 186, is tapped between the resistors 183 and 184 to provide a positive voltage for the emitter of the transistor 181. The collector of the transistor 181 is connected to the negative terminal of the voltage regulator, which is also connected to the negative side of the output of the filter 22 via the lead 71.

The base of a transistor 187 is connected to the junction of the resistors 184 and 185. The collector of the transistor 187 is connected to the negative lead 71 via a resistor 188. The emitter of the transistor 187 is connected to the oscillator 16 via a lead 189, also shown in FIG. 9. The variable resistor 186 is connected to the oscillator 16 via a lead 191 which is also connected to the positive side of the voltage regulator 18 and is also shown in FIG. 9. The negative lead 71 is connected to the voltage regulator 18 via a lead 192.

The transistor 181 functions in a manner whereby the voltage between the emitter and the collector thereof remains substantially equal to the voltage across the resistor 183. As the transistor 181 is made more conductive, the voltage across the resistor 183 decreases thereby causing an increase in the current through the series circuit comprising the resistors 184 and 185 and the variable resistor 186. Since the voltage across the resistor 185 and the variable resistor 186 increases, the emitter potential of the transistor 187 also increases. The emitter potential of the transistor 187 is substantially equal to the voltage across the resistor 185 and the variable resistor 186. The resistor 188 minimizes the dissipation in the transistor 187.

Figure 8:
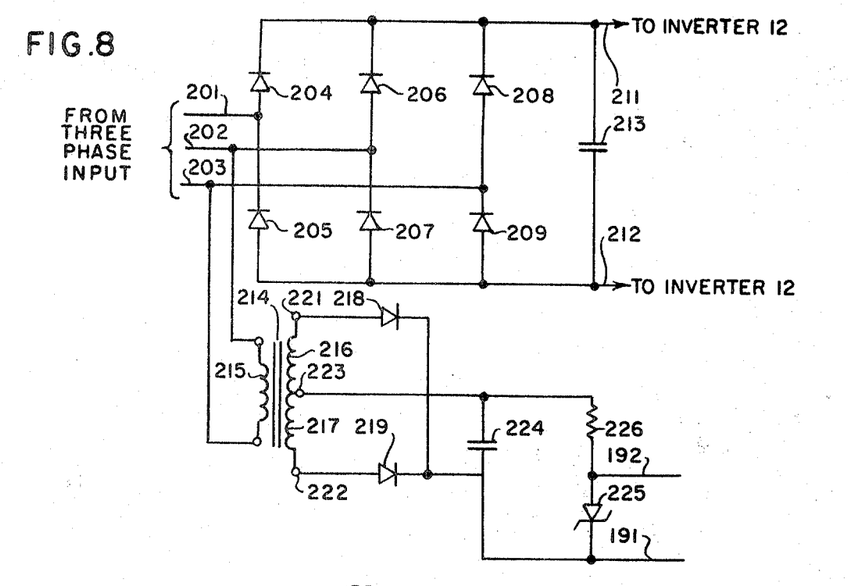
FIG. 8 is a circuit diagram of the input full-wave rectifier filter and voltage regulator of the embodiment of FIG. 6.

If a three-phase power supply is utilized in the input 11 of FIG. 6, the full-wave rectifier 171 may comprise a three-phase full-wave rectifier bridge as shown in FIG. 8. In FIG. 8, AC power from a three-phase source of electrical energy (not shown in FIG. 8) is supplied to a three-phase full-wave rectifier bridge via input leads 201, 202 and 203. The rectifier bridge comprises three pairs of rectifier diodes, each pair associated with a line of the three-phase AC. The first pair of rectifier diodes comprises rectifier diodes 204 and 205, the second pair of rectifier diodes comprises rectifier diodes 206 and 207, and the third pair of rectifier diodes comprises rectifier diodes 208 and 209.

The three-phase input voltage may have, for example, an RMS value of 208 volts, so that it produces a DC voltage at the output of the three-phase rectifier bridge, across leads 211 and 212, which is approximately 245 volts. The DC output voltage of the rectifier bridge is filtered by a capacitor 213. The leads 211 and 212 are connected to the inverter 12.

The voltage regulated power supply system of FIGS. 5, 6, 7, 8 and 9 operates in the following manner. The three-phase input from the input 11 is rectified by the full-wave rectifier 171. The inverter 12 produces from the DC voltage produced by the full-wave rectifier 171 an AC output voltage of square waveshape at a frequency of about 120 cycles per second. The tuned ferroresonant transformer 13 transforms the square wave output of the inverter 12 into an AC voltage having a substantially constant amplitude at any single frequency, as previously explained. The output of the ferroresonant transformer 13 is applied to the single phase full-wave rectifier 14.

The output of the full-wave rectifier 14 is applied to the filter 22. The filtered output voltage is applied to the load in the output 15. The comparator of the voltage feedback circuit 17' compares the voltage across the load with a standard voltage across the Zener diodes 143' and 144', by comparing a portion of the load voltage with the standard voltage (FIG. 7). The portion of the load voltage compared is provided by the voltage divider 149', 151' and is applied to the transistors 141' and 142' (FIG. 7). The transistors 181 and 187 establish a voltage comparable to the magnitude of the load voltage across the input of the oscillator 16 and thereby vary the frequency of oscillation of said oscillator (FIG. 9). The oscillator 16 produces an output which varies in frequency in accordance with variations in the magnitude of the voltage applied to its input. The output voltage of the oscillator 16 thus varies the frequency of the parallel inverter 12 and thereby varies the magnitude of the output voltage of the ferroresonant transformer 13 by variation of the frequency of the input voltage applied to said ferroresonant transformer.

Thus, for example, if the DC voltage at the output of the filter 22 is higher in magnitude than is desired, the voltage across the resistor 151' is greater in magnitude than the voltage across the diodes 143' and 144' thereby making the transistor 142' more non-conductive and making transistor 141' more conductive (FIG. 7). This makes the voltage at the base of the transistor 181 more positive, so that said transistor is made more non-conductive and the voltage across the resistor 183 (FIG. 7) is increased in magnitude. The resulting decrease in current through the resistors 185 and 186 reduces the voltage between the leads 189 and 191 (FIG. 7) and decreases the frequency of oscillation of the oscillator 16 and the frequency of the inverter 12. The decrease in frequency of the input voltage to the ferroresonant transformer 13 decreases the magnitude of the output voltage of said ferroresonant transformer thereby decreasing the magnitude of the DC voltage at the output of the filter 22.

In FIG. 8, a transformer 214 has a primary winding 215 connected to two leads 202 and 203 of the three-phase input leads 201, 202 and 203, and a secondary winding 216, 217. A pair of rectifier diodes 218 and 219 are connected to the end terminals 221 and 222, respectively, of the secondary winding 216, 217. The secondary winding 216, 217 has a center tap 223. The cathodes of the rectifier diodes 218 and 219 are connected together and a capacitor 224 is connected between the tap 223 and a common point in the connection between the cathodes of said diodes. A Zener diode 225 is connected between the leads 191 and 192 and a resistor 226 is connected in series with said Zener diode. The series connection of the Zener diode 225 and the resistor 226 is connected across the capacitor 224.

Any suitable circuit which provides a substantially square wave voltage having a frequency which varies with the magnitude of its input voltage may be utilized in place of the Royer oscillator 16. The frequency of operation of the inverter 12 is determined by the desired output characteristics. The design considerations of the inverter circuit 12 and the ferroresonant transformer 13 also determine the operating frequency.

The voltage regulated power supply of the present invention solves many problems inherent in other types of regulated power supplies. Thus, for example, if the load is removed from the system of the present invention, the tendency for the closed loop to overshoot in voltage is minimized. Furthermore, the output of the voltage regulated power supply system of the present invention may be short-circuited completely without damage to the SCR's and without damage to the rectifier diodes. This is due to the fact that the drop in load voltage would raise the frequency of the oscillator 16 and the inverter 12 beyond the limited operating range of the ferroresonant transformer 13. The voltage of the secondary winding of the ferroresonant transformer thus settles at a safe value and produces currents which do not adversely affect the rectifier diodes.

Any suitable feedback circuit may be utilized for controlling the voltage regulation. The frequency of the system of the present invention is controlled between a maximum and a minimum value, and is not controlled over an infinite range from zero up. This is due to the fact that the ferroresonant transformer 13 and the transformer of the oscillator 16 are capable of absorbing only a determined magnitude of voltage at minimum frequencies. At excessive frequencies there are problems of core loss and excessive output voltage.

The modification of FIGS. 6 and 8 provides control of a three-phase power system with single phase components and single phase circuits. This simplifies the power output wiring. The parallel inverter may utilize transistors instead of SCR's. A transistorized parallel inverter comprises a high power multivibrator. The SCR's, however, are able to absorb higher voltages at larger currents than presently available power transistors. An advantage of the parallel inverter 12 is that SCR's conduct from a 180 degree period per cycle and thereby provide considerably better utilization of the SCR's than conventional phase-controlled power supplies. The average current which can be permitted to flow through the SCR's is less at reduced conduction angles.

The ferroresonant transformer protects the rectifier diodes against voltage transients. The rectifier diodes of the embodiment of FIG. 8 may be of the controlled avalanche type and thus protect themselves against voltage transients. These controlled avalanche type rectifier diodes in turn protect the SCR's of the inverter 12 against voltage transients.

FIG. 9 shows the circuit of an oscillator which may be utilized as the oscillator 16 of FIGS. 1, 2, 3 and 6 and specifically of FIG. 6. The oscillator of FIG. 9 is the same as that of FIG. 4B and includes the leads 189 and 191 for connection to and operation with the circuit of FIG. 7. A lead 231 is connected between the end terminal 100 of the primary winding 96 and one end terminal of the winding 106. A resistor 232 is connected between the center tap 105 of the secondary winding 105 and a common point in the connection between the emitter electrodes of the transistors 98 and 99.

While the invention has been described by means of specific examples and in specific embodiments, I do not which to be limited thereto, for obvious modifications will occur to those skilled in the art without departing from the spirit and scope of the invention.

I claim:
1. A voltage regulated converter, comprising
  input voltage means for providing an input voltage;
  output voltage means coupled to said input voltage means for providing an output voltage from said input voltage, said output voltage means including voltage control means having an input and an output for providing at its output an output voltage having a magnitude dependent upon the frequency of the input voltage at its input, said output voltage control means comprising ferroresonant transformer means;
  feedback means coupled between the output and the input of said voltage control means for varying the frequency of the input voltage of said voltage control means in accordance with the variations of the output voltage thereof thereby to vary the magnitude of said output voltage to compensate for variations thereof, said feedback means comprising oscillator means for producing a voltage having a frequency of oscillation which varies directly as the magnitude of a voltage applied to said oscillator means;
  voltage regulating means for energizing said oscillator means at a substantially constant voltage; and
  coupling means coupling said voltage regulating means to said oscillator means.

2. A voltage regulated converter, comprising
  input voltage means for providing an input voltage;
  output voltage means coupled to said input voltage means for providing an output voltage from said input voltage, said output voltage means including voltage control means having an input and an output for providing at its output an output voltage having a magnitude dependent upon the frequency of the input voltage at its input, said output voltage control means comprising ferroresonant transformer means;
  feedback means coupled between the output and the input of said voltage control means for varying the frequency of the input voltage of said voltage control means in accordance with variations of the output voltage thereof thereby to vary the magnitude of said output voltage to compensate for variations thereof, said feedback means comprising oscillator means for producing a voltage having a frequency of oscillation which varies directly as the magnitude of a voltage applied to said oscillator means;
  voltage regulating means for energizing said oscillator means at a substantially constant voltage; and
  coupling means coupling said voltage regulating means to said oscillator means, said coupling means including diode means for controlling the magnitude of the voltage applied to said oscillator means and thereby the frequency of said oscillator means.

3. A voltage regulated converter as claimed in claim 2, further comprising transformer means coupled across said diode means for controlling the conductive condition of said diode means.

4. A voltage regulated converter as claimed in claim 3, wherein said transformer means is coupled between said ferroresonant transformer means and said diode means.

5. A voltage regulated converter, comprising
  input voltage means for providing an input voltage;
  output voltage means coupled to said input voltage means for providing an output voltage from said input voltage, said output voltage means including current control means comprising ferroresonant transformer means having an input and an output for providing at its output an output current having a magnitude dependent upon the frequency of the input voltage at its input;
  feedback means coupled between the output and the input of said current control means for varying the frequency of the input voltage of said current control means in accordance with variations of the output current thereof, thereby to vary the magnitude of said output current to compensate for variations thereof, said feedback means comprising oscillator means for producing a voltage having a frequency of oscillation which varies directly as the magnitude of a current applied to said oscillator means;
  voltage regulating means for energizing said oscillator means at a substantially constant voltage; and
  coupling means coupling said voltage regulating means to said oscillator means.

6. A voltage regulated converter as claimed in claim 5, wherein said coupling means includes diode means for controlling the magnitude of the voltage applied to said oscillator means and thereby the frequency of said oscillator means.

7. A voltage regulator converter as claimed in claim 6, further comprising transformer means coupled across said diode means for controlling the conductive condition of said diode means.

8. A voltage regulated converter as claimed in claim 7, wherein said transformer means is coupled between said ferroresonant transformer means and said diode means.

References Cited

UNITED STATES PATENTS

| | | | |
|---|---|---|---|
| 3,109,133 | 10/1963 | Mills | 321—2 |
| 3,197,691 | 7/1965 | Gilbert | 321—18 |
| 3,061,769 | 10/1962 | Smyth | 321—16 |
| 3,320,510 | 5/1967 | Locklair | 321—2 |
| 3,325,716 | 6/1967 | Gomi | 321—2 |
| 3,327,199 | 6/1967 | Gardner et al. | 321—2 |

OTHER REFERENCES

Electro-Technology, "An Improved Ferro-Resonant Transformer," vol. 69, pp. 128, 130, March 1962.

IBM Technical Disclosure Bulletin, "Regulated Power Supply," 1 p., vol. 7, No. 10, May 1965.

JOHN F. COUCH, Primary Examiner
W. H. BEHA, JR., Assistant Examiner

U.S. Cl. X.R.
321—14, 19